US012434145B2

(12) United States Patent
Wang

(10) Patent No.: US 12,434,145 B2
(45) Date of Patent: Oct. 7, 2025

(54) CONTROLLING A VIRTUAL VEHICLE USING AUXILIARY CONTROL FUNCTION

(71) Applicant: Tencent Technology (Shenzhen) Company Limited, Guangdong (CN)

(72) Inventor: Tao Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 343 days.

(21) Appl. No.: 17/992,491

(22) Filed: Nov. 22, 2022

(65) Prior Publication Data

US 2023/0082510 A1 Mar. 16, 2023

Related U.S. Application Data

(63) Continuation of application No. PCT/CN2022/082037, filed on Mar. 21, 2022.

(30) Foreign Application Priority Data

Apr. 26, 2021 (CN) ......................... 202110454401.4

(51) Int. Cl.
*A63F 13/56* (2014.01)
*A63F 13/533* (2014.01)
(Continued)

(52) U.S. Cl.
CPC ............ *A63F 13/56* (2014.09); *A63F 13/533* (2014.09); *A63F 13/5375* (2014.09); *A63F 13/803* (2014.09); *A63F 2300/5553* (2013.01)

(58) Field of Classification Search
CPC ....... A63F 13/56; A63F 13/803; A63F 13/422
See application file for complete search history.

(56) References Cited

U.S. PATENT DOCUMENTS 10,449,451 B2 * 10/2019 Utsugi .................. A63F 13/573
2007/0265087 A1 * 11/2007 Akahori .............. A63F 13/5258
463/37

(Continued)

FOREIGN PATENT DOCUMENTS

CN 105807762 A 7/2016
CN 108579079 A 9/2018

(Continued)

OTHER PUBLICATIONS

International Search Report and Written Opinion in PCT/CN2022/082037, mailed Jun. 23, 2022, 12 pages.

(Continued)

*Primary Examiner* — James S. McClellan
(74) *Attorney, Agent, or Firm* — ArentFox Schiff LLP

(57) ABSTRACT

A method for controlling a virtual vehicle includes displaying, on a graphical user interface, a virtual vehicle in a virtual environment, and controlling the virtual vehicle to drive in the virtual environment in response to a control operation input into the graphical user interface. The method further includes determining whether movement of the virtual vehicle in the graphical user interface based on the control operation meets a predefined condition, and, in response to a determination that the movement of the virtual vehicle in response to the control operation meets the predefined condition, controlling the virtual vehicle independently of the control operation to move away from a road boundary.

19 Claims, 10 Drawing Sheets

(51) Int. Cl.
*A63F 13/5375* (2014.01)
*A63F 13/803* (2014.01)

(56) References Cited

U.S. PATENT DOCUMENTS

| | | | | |
|---|---|---|---|---|
| 2015/0339854 | A1* | 11/2015 | Adler | G16H 20/30 345/419 |
| 2016/0210382 | A1 | 7/2016 | Alaniz et al. | |
| 2020/0289933 | A1* | 9/2020 | Seropian | A63F 13/537 |

FOREIGN PATENT DOCUMENTS

| | | | |
|---|---|---|---|
| CN | 108885152 | A | 11/2018 |
| CN | 109991015 | A | 7/2019 |
| CN | 111228804 | A | 6/2020 |
| CN | 112148622 | A | 12/2020 |
| CN | 113041619 | A | 6/2021 |

OTHER PUBLICATIONS

Chinese Office Action in 202110454401.4, mailed Oct. 21, 2022, 13 pages.

* cited by examiner

CONTROLLING A VIRTUAL VEHICLE USING AUXILIARY CONTROL FUNCTION

RELATED APPLICATIONS

This application is a continuation of PCT/CN2022/082037, entitled "VIRTUAL VEHICLE CONTROL METHOD AND APPARATUS, DEVICE, MEDIUM, AND PROGRAM PRODUCT," filed on Mar. 21, 2022, which claims priority to Chinese Patent Application No. 202110454401.4, filed on Apr. 26, 2021 and entitled "METHOD AND APPARATUS FOR CONTROLLING VIRTUAL VEHICLE, DEVICE, AND MEDIUM." The entire disclosures of the prior applications are hereby incorporated by reference.

FIELD OF THE TECHNOLOGY

This application relates to the field of virtual world control, including a method and an apparatus for controlling a virtual vehicle, a device, a medium, and a program product.

BACKGROUND OF THE DISCLOSURE

In a racing game, a plurality of users are divided into two opposing groups or the plurality of users are grouped individually. The users manipulate virtual vehicles in virtual environments to race and are ranked in an order in which the virtual vehicles arrive from starting points to ending points.

In the related art, in a case that a user is exposed to the racing game for a relatively short time, an auxiliary route is displayed in the virtual environment, to guide the user to operate properly. The auxiliary route is configured to inform the user that a shortest steering time or a shortest steering path can be obtained in a case that the virtual vehicle moves along the auxiliary route. In practical operation, the user needs to control the virtual vehicle to move along the auxiliary route.

In the related art, only a preferred auxiliary route is provided. However, some users are exposed to the racing game for a relatively short time and are not skilled in operating the virtual vehicles. Therefore, even if an auxiliary route is provided, the users are easy to make mistakes when steering, thereby causing the virtual vehicles to deviate from the auxiliary route.

SUMMARY

Embodiments of this disclosure provide a method and an apparatus for controlling a virtual vehicle, a device, a medium, and a program product. According to the method, a virtual vehicle is controlled to steer by using auxiliary steering logic in a case that an auxiliary condition is satisfied, and a user does not need to perform an additional operation, which enables a novice user to steer successfully under complex road conditions.

In an embodiment, a method for controlling a virtual vehicle includes controlling display, on a graphical user interface, of a virtual vehicle in a virtual environment, and controlling the virtual vehicle to drive in the virtual environment in response to a control operation input into the graphical user interface. The method further includes determining whether movement of the virtual vehicle in the graphical user interface based on the control operation meets a predefined condition, and, in response to a determination that the movement of the virtual vehicle in response to the control operation meets the predefined condition, controlling the virtual vehicle independently of the control operation to move away from a road boundary.

In an embodiment, an apparatus for controlling a virtual vehicle includes processing circuitry configured to control display, on a graphical user interface, of a virtual vehicle in a virtual environment, and control the virtual vehicle to drive in the virtual environment in response to a control operation input into the graphical user interface. The processing circuitry is further configured to determine whether movement of the virtual vehicle in the graphical user interface based on the control operation meets a predefined condition, and, in response to a determination that the movement of the virtual vehicle in response to the control operation meets the predefined condition, control the virtual vehicle independently of the control operation to move away from a road boundary.

In an embodiment, a non-transitory computer-readable storage medium stores computer-readable instructions thereon, which, when executed by a computer, cause the computer to perform a method for controlling a virtual vehicle, the method includes controlling display, on a graphical user interface, of a virtual vehicle in a virtual environment, and controlling the virtual vehicle to drive in the virtual environment in response to a control operation input into the graphical user interface. The method further includes determining whether movement of the virtual vehicle in the graphical user interface based on the control operation meets a predefined condition, and, in response to a determination that the movement of the virtual vehicle in response to the control operation meets the predefined condition, controlling the virtual vehicle independently of the control operation to move away from a road boundary.

In a case that the user controls the virtual vehicle to drive and the auxiliary condition is satisfied, the auxiliary steering logic (auxiliary control function) is used to control the virtual vehicle to steer or drive, and the user does not need to perform operations. Therefore, operation steps by the user can be effectively reduced, and repeated operations by the user are avoided, thereby improving human-computer interaction efficiency.

DESCRIPTION OF EMBODIMENTS

Figure 1:
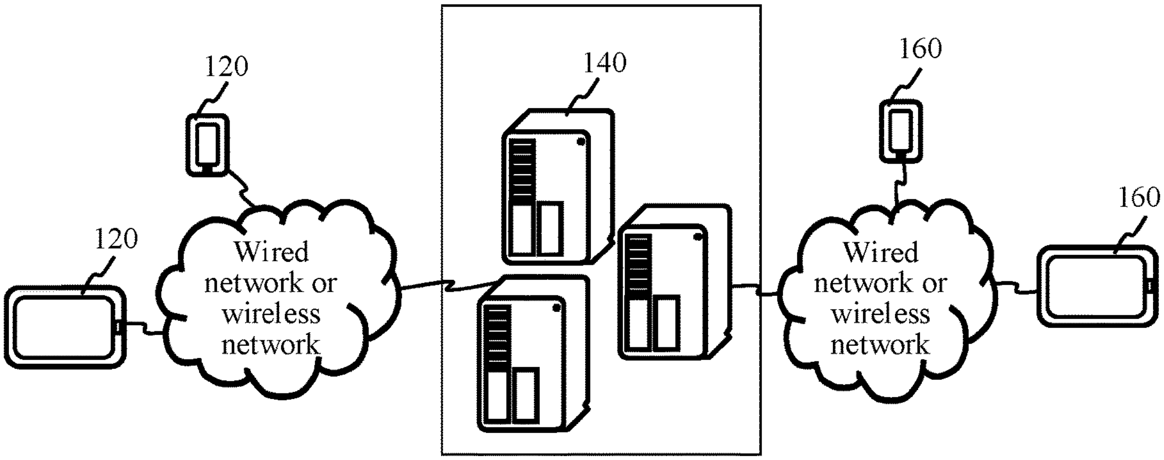
FIG. 1 is a schematic diagram of a computer system according to an exemplary embodiment of this disclosure.

First, terms involved in the embodiments of this disclosure are introduced:

Graphical user interface (GUI) refers to a computer operating user interface displayed in a graphical form. The graphical user interface is an interface display format for human-computer communication, and allows a user to manipulate an icon or a menu option on a screen by using an input device such as a mouse, to select a command, invoke a file, start a program, or perform some other routine tasks. In the graphical user interface, what the user sees and manipulates are graphical objects.

Virtual environment refers to a virtual environment displayed (or provided) in a case that an application is run on a terminal. The virtual environment may be a three-dimensional virtual environment, or may be a two-dimensional virtual environment. The three-dimensional virtual environment may be a simulation environment of a real world, or may be a semi-simulation and semi-fiction environment, or may be a pure fiction environment.

Virtual vehicle refers to a vehicle in a virtual environment. In an embodiment, in a case that the virtual environment is a three-dimensional virtual environment, the virtual vehicle is a three-dimensional model created based on an animation skeleton technology. Each virtual vehicle has a shape and a volume in the three-dimensional virtual environment, and occupies some space in the three-dimensional virtual environment. In an embodiment, in a case that the virtual environment is a two-dimensional virtual environment, the virtual vehicle is a two-dimensional model created based on an animation technology. Each virtual vehicle has a shape and a volume in the two-dimensional virtual environment, and occupies some space in the two-dimensional virtual environment. In the embodiments of this disclosure, the virtual vehicle includes at least one of a virtual car, a virtual plane, a virtual ship, or a virtual train. A type of the virtual vehicle is not specifically limited in the embodiments of this disclosure.

Racing game refers to a game in which a virtual environment is provided in a virtual world, to allow a plurality of users to race in the virtual scene. Generally, a plurality of players in the racing game are divided into a plurality of camps, or the players are grouped individually. All players start from a starting point simultaneously, and one or more players who first arrive an end point are the winner. The racing game takes place in rounds. A duration of a round of the racing game is from a time point at which the game starts to a time point at which the victory condition is met.

Multiplayer online battle arena (MOBA) game is a game in which several forts are provided in a virtual world, and users on different camps control virtual characters to battle in the virtual world, occupy forts or destroy forts of the opposing camp. For example, in the MOBA game, the users may be divided into two opposing camps. The virtual characters controlled by the users are scattered in the virtual world to compete against each other, and the victory condition is to destroy or occupy all enemy forts. The MOBA game takes place in rounds. A duration of a round of the MOBA game is from a time point at which the game starts to a time point at which the victory condition is met.

First person shooting (FPS) game is a game in which several forts are provided in a virtual world, and users on different camps control virtual characters to battle in the virtual world, occupy forts or destroy forts of the opposing camp, or kill all or some of the characters of the opposing camp. Generally, in the FPS game, the user may play the game from a first-person perspective, and may also select to play the game from a third-person perspective. For example, in the FPS game, the users may be divided into two opposing camps. The virtual characters controlled by the users are scattered in the virtual world to compete against each other, and the victory condition is to kill all enemy users. The FPS game takes place in rounds. A duration of a round of the FPS game is from a time point at which the game starts to a time point at which the victory condition is met.

Simulation game (SLG) is a type of game in which virtual resources are provided in a virtual world to simulate the reality. For example, in the SLG game, a plurality of users can separately form a camp, and the plurality of users work together to complete specified tasks. In a round of the SLG game, there is usually no victory condition.

The information (including but not limited to user equipment information, user personal information, and the like), data (including but not limited to data for analysis, stored data, displayed data, and the like), and signals involved in this disclosure are authorized by the users or are fully authorized by all parties, and collection, use, and processing of the relevant data need to comply with relevant laws, regulations and standards in relevant countries and regions.

FIG. 1 is a structural block diagram of a computer system according to an exemplary embodiment of this disclosure. The computer system 100 includes a first terminal 120, a server cluster 140, and a second terminal 160.

An application supporting a virtual environment is installed and run on the first terminal 120. The application may be any one of a racing game, a MOBA game, a VR application, a 3D map application, an FPS game, and a multiplayer gunfight survival game. The first terminal 120 is a terminal used by a first user, and the first user uses the first terminal 120 to operate a first virtual vehicle located in the three-dimensional virtual environment to perform a movement.

The first terminal 120 is connected to the server cluster 140 by using a wireless network or wired network.

The server cluster 140 includes at least one of one server, a plurality of servers, a cloud computing platform, and a virtualization center. The server cluster 140 is configured to provide a background service for the application supporting the virtual environment. In an embodiment, the server cluster 140 takes on primary computing work, and the first terminal 120 and the second terminal 160 take on secondary computing work; alternatively, the server cluster 140 takes on secondary computing work, and the first terminal 120 and the second terminal 160 take on primary computing work; alternatively, collaborative computing is performed by using a distributed computing architecture among the server cluster 140, the first terminal 120, and the second terminal 160.

An application supporting a virtual environment is installed and run on the second terminal 160. The application may be any one of a racing game, a MOBA game, a VR application, a 3D map application, an FPS game, and a multiplayer gunfight survival game. The second terminal 160 is a terminal used by a second user, and the second user uses the second terminal 160 to operate a second virtual vehicle located in the three-dimensional virtual environment to perform a movement. The first virtual vehicle and the second virtual vehicle may belong to the same team, or the same organization, have a friend relationship with each other, or have a temporary communication permission. The second terminal 160 may be a computer device.

In an embodiment, the applications installed on the first terminal 120 and the second terminal 160 are the same, or the same type of applications on different platforms. The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a moving picture experts group audio layer III (MP3) player, a moving picture experts group audio layer IV (MP4) player, a laptop, and a desktop computer.

The racing game has a high requirement on an operating level of the user, and requires the user to master various operation skills such as drifting and rapid steering. However, novice users who are new to the racing game are not proficient in the operation skills, and are prone to operational errors, thereby causing game failures and bringing a sense of frustration to the users.

In addition, the racing game also requires the novice users to play the game many times and keep repeating the operations such as drifting and fast cornering. Through such a repeated training method, the novice users can learn how to perform the foregoing operations. However, the novice users are prone to the operational errors when controlling virtual vehicles, and a plurality of operational errors bring the sense of frustration to the users, which affects game experience of the users, as well as operations of the users, thereby forming a vicious circle.

Therefore, how to enable these novice users to control movements of the virtual vehicles in person to learn various operation skills, and how to reduce operation steps by the users on the basis of ensuring that the users perform operations in person, to avoid repeated operations by the users and improve the human-computer interaction efficiency is one of the problems to be solved by this disclosure.

Figure 2:
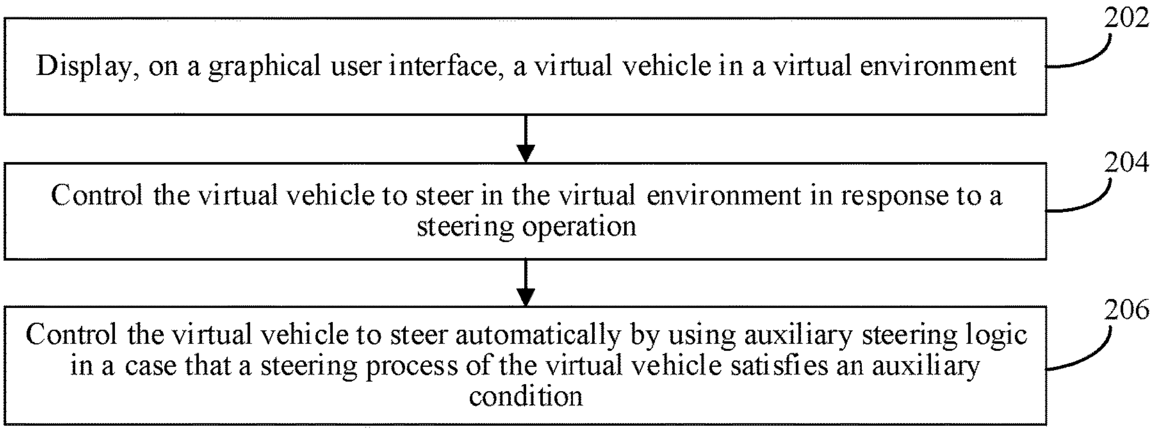
FIG. 2 is a schematic flowchart of a method for controlling a virtual vehicle according to an exemplary embodiment of this disclosure.

FIG. 2 is a flowchart of a method for controlling a virtual vehicle according to an exemplary embodiment of this disclosure. The method may be performed by the terminal 120 or the terminal 160 shown in FIG. 1. The method includes the following steps:

Step 202: Display, on a graphical user interface, a virtual vehicle in a virtual environment. For example, control is performed to display the virtual vehicle on the graphical user interface.

The virtual environment is obtained by performing observation in a virtual world from a first-person perspective or a third-person perspective in a process in which the application on the terminal is run. In this embodiment of this disclosure, the virtual environment may be a picture in a case that the virtual vehicle is observed in the virtual world by using a camera model.

In an embodiment, the camera model performs automatic following on the virtual vehicle in the virtual world, that is, in a case that a position of the virtual vehicle in the virtual world changes, a position of the camera model changes simultaneously with the position of the virtual vehicle in the virtual world. In addition, the camera model is always within a preset distance range of the virtual vehicle in the virtual world. In an embodiment, in the automatic following process, relative positions between the camera model and the virtual vehicle remain unchanged.

The virtual vehicle refers to a vehicle mainly controlled by a user in the virtual environment. The virtual vehicle is at least one of a virtual car, a virtual plane, a virtual boat, a virtual trailer, a virtual car train, a virtual moped, or a virtual motorcycle.

In an embodiment, the virtual vehicle is taken by a virtual character. The user controls the virtual vehicle through the virtual character.

In an embodiment, the virtual vehicle is a vehicle held by the user, or the virtual vehicle is a vehicle that is not held by the user. Optionally, the user obtains the virtual vehicle in at least one of the following manners: the user uses a virtual resource to exchange the virtual vehicle; the user completes a preset task to obtain the virtual vehicle; or the user obtains the virtual vehicle through a gift from another user.

In an embodiment, the graphical user interface further includes a direction control, where the direction control is configured to control a movement direction of the virtual vehicle. Exemplarily, the direction control is at least one of a joystick component, a steering wheel component, or a direction key.

Figure 3:
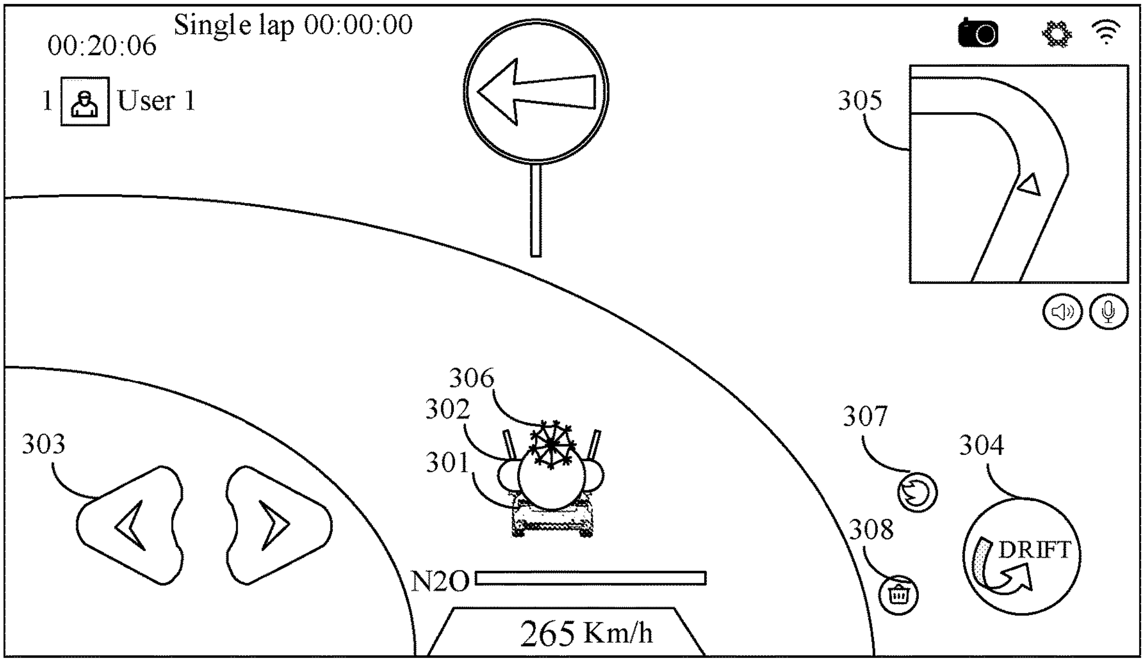
FIG. 3 is a schematic diagram of an interface of a method for controlling a virtual vehicle according to an exemplary embodiment of this disclosure.

Exemplarily, as shown in FIG. 3, a virtual vehicle 301 and a direction control 303 are displayed on the graphical user interface, and there is a virtual character 302 in the virtual vehicle 301.

In an embodiment, at least one of a mini-map, an acceleration control, a backpack control, a volume switch, a microphone switch, or a virtual prop is also displayed on the graphical user interface. The mini-map is used for displaying a map of the virtual environment; the acceleration control is configured to increase or reduce a speed of the virtual vehicle; the backpack control is configured for the user to view held virtual props; the volume switch is configured to turn the sound of the application on or off; and the microphone switch is configured to turn the microphone on or off. Exemplarily, as shown in FIG. 3, an acceleration control 304, a mini-map 305, a virtual prop 307, and a backpack control 308 are also displayed on the graphical user interface.

Step 204: Control the virtual vehicle to steer (or drive) in the virtual environment in response to a steering operation (or a control operation). For example, the virtual vehicle is controlled to drive in the virtual environment in response to a control operation input into the graphical user interface.

Herein, the term "steer" and "steering operation" may not be limited to steering control and may include additional vehicle control functions, such as acceleration/speed control and/or gear shift control. Accordingly, step 204 may include controlling the virtual vehicle to drive according to control operations corresponding to the above-listed vehicle control functions. Other portions of the disclosure are likewise intended to encompass embodiments in which additional vehicle control functions are included under the terms "steer" and "steering control."

The steering operation is used for controlling the virtual vehicle to steer in the virtual environment. The steering operation is to press one or more preset physical buttons to control the virtual vehicle to steer in the virtual environment, or the steering operation may be a steering operation performed through a signal generated by performing long-pressing, clicking, double-clicking and/or swiping on a designated area of a touch screen.

Exemplarily, the virtual vehicle is controlled to steer in the virtual environment in response to a trigger operation on the direction control. Exemplarily, the virtual vehicle is controlled to steer in the virtual environment in response to a trigger operation on the physical button.

In an embodiment, steering of the virtual vehicle includes drift steering.

Step 206: Control the virtual vehicle to steer (or drive) automatically by using auxiliary steering logic (or an auxiliary control function) in a case that a steering process of the virtual vehicle satisfies an auxiliary condition. For example, it is determined whether movement of the virtual vehicle in the graphical user interface based on the control operation meets a predefined condition. In response to a determination that the movement of the virtual vehicle in response to the control operation meets the predefined condition, the virtual vehicle is controlled independently of the control operation to move away from a road boundary.

The auxiliary condition is used for determining that the auxiliary steering logic is enabled to control the virtual vehicle. In an embodiment, the auxiliary condition includes at least one of the following: in a case that the virtual vehicle acts according to a current state, it is predicted that the virtual vehicle fails to steer; in a case that the virtual vehicle acts according to the current state, it is predicted that the virtual vehicle fails to drive straight; in a case that the virtual vehicle acts according to the current state, it is predicted that the virtual vehicle fails to drift; or in a case that the virtual vehicle acts according to the current state, it is predicted that the current virtual vehicle collides with another virtual vehicle. The current state includes at least one of the speed and a moving direction of the virtual vehicle. Exemplarily, the virtual vehicle steers at a position A of a bend, the speed of the virtual vehicle is 50 km/h, and the virtual vehicle moves along a southeast direction. In a case that the virtual vehicle continues to move along the southeast direction at the speed of 50 km/h, it is predicted that the virtual vehicle will collide with another virtual vehicle after 2 s. In this case, it is determined that the steering process of the virtual vehicle satisfies the auxiliary condition.

The auxiliary condition may further include at least one of the following events: the moving direction of the virtual vehicle inconsistent with a preset direction; the virtual vehicle colliding with a virtual obstacle; an angle between the virtual vehicle and a road boundary inconsistent with a preset angle; the speed of the virtual vehicle being less than a threshold; a distance between the virtual vehicle and the road boundary being less than a threshold; a failure occurring in the virtual vehicle; difficulty of the bend being higher than a preset value; a quantity of consecutive bends being greater than a preset value; or another preset event.

The auxiliary steering logic corrects the steering of the virtual vehicle, so that the virtual vehicle completes the steering successfully.

In an embodiment, the auxiliary steering logic is program code used for assisting the virtual vehicle to complete the steering. In an embodiment, the auxiliary steering logic is program code provided by the application, or the auxiliary steering logic is program code provided by a plug-in in the application.

In a specific implementation, the auxiliary steering logic is an auxiliary steering model. In a case that the steering process of the virtual vehicle satisfies the auxiliary condition, the position and speed of the virtual vehicle are obtained; data processing is performed on the position and speed of the virtual vehicle by using the auxiliary steering model, to obtain a target position and a target speed of the virtual vehicle; and the virtual vehicle is controlled to steer according to the target position and the target speed of the virtual vehicle. Exemplarily, in a case that the steering process of the virtual vehicle satisfies the auxiliary condition, the virtual vehicle is located at a point A of the bend. In a case that the speed of the virtual vehicle is 60 km/h, data processing is performed on the position and speed of the virtual vehicle by using the auxiliary steering model, to determine that the target position of the virtual vehicle is at a point B of the bend. In a case that the target speed of the virtual vehicle is 50 km/h, the virtual vehicle is controlled to move toward the point B of the bend, and the speed of the virtual vehicle is reduced to 50 km/h.

In an embodiment, the foregoing auxiliary steering model is obtained through training by performing the following steps: obtaining a sample steering video; extracting a first position and a first speed of a sample virtual vehicle at a first moment from the sample steering video, and extracting a second position and a second speed of the sample virtual vehicle at a second moment, where the second moment being later than the first moment; performing data processing on the first position and the first speed of the sample virtual vehicle by using the auxiliary steering model, to obtain a predicted position and a predicted speed of the sample virtual vehicle; and training the auxiliary steering model according to a position difference between the predicted position and the second position, and a speed difference between the predicted speed and the second speed. A time required for the sample virtual vehicle in the sample steering video to complete the steering is less than a preset time threshold, or a distance used by the sample virtual vehicle to complete the steering is less than a preset distance threshold. Exemplarily, the sample steering video is a steering video of a skilled game player, or the sample steering video is a steering video of a game competition player. The skilled game player refers to a user account whose proficiency degree reaches a target condition, and the game competition player refers to a user account participating in game competitions. The foregoing steering videos are all game videos in which steering is performed properly.

In an embodiment, the foregoing auxiliary steering model is still obtained through training by performing the following steps: obtaining an operating parameter of the sample virtual vehicle in a steering process; obtaining the first position and the first speed of the sample virtual vehicle at the first moment from the operating parameter, and extracting the second position and the second speed of the sample virtual vehicle at the second moment, where the second moment being later than the first moment; performing data processing on the first position and the first speed of the sample virtual vehicle by using the auxiliary steering model, to obtain the predicted position and the predicted speed of the sample virtual vehicle; and training the auxiliary steering model according to the position difference between the predicted position and the second position, and the speed difference between the predicted speed and the second speed.

In an implementation, in a case that the auxiliary steering logic is used to control the virtual vehicle to steer automatically, the steering process of the virtual vehicle is taken over by the auxiliary steering logic. In this case, the user cannot control the virtual vehicle. In a case that the virtual vehicle completes the steering, the user can control the virtual vehicle again.

In an implementation, in a case that the auxiliary steering logic is used to control the virtual vehicle to steer automatically, the steering process of the virtual vehicle is assisted by the auxiliary steering logic. Exemplarily, in a case that the user can still control the steering of the virtual vehicle, the auxiliary steering logic corrects the steering of the virtual vehicle. For example, in a case that the user controls the virtual vehicle to steer 80 degrees toward the right front, the auxiliary steering logic corrects the operation of the user, to make the virtual vehicle steer 70 degrees toward the right front.

Exemplarily, in the steering process of the virtual vehicle, in a case that the virtual vehicle is about to collide with a virtual obstacle beside the road, the auxiliary condition is satisfied. In this case, the auxiliary steering logic is enabled, and the steering of the virtual vehicle is controlled by the auxiliary steering logic, to prevent the virtual vehicle from colliding with the virtual obstacle. Exemplarily, in a moving process of the virtual vehicle, in a case that the virtual vehicle moves to the east side, while a direction preset by the terminal or the server is the west side, the auxiliary steering logic is enabled, and the moving direction of the virtual vehicle is controlled by the auxiliary steering logic, to prevent the virtual vehicle from moving in a wrong direction.

In an embodiment, the auxiliary steering logic is used to control the virtual vehicle to steer automatically in a case that the steering process of the virtual vehicle satisfies a steering failure condition (or control failure condition). The steering failure condition refers to a condition for predicting occurrence of a steering failure (or control failure) of the virtual vehicle. In other words, in the steering process of the virtual vehicle, a steering result of the virtual vehicle is predicted. The steering result includes two cases: steering succeeded and steering failed. In a case that steering result of the virtual vehicle is that the steering fails, it is determined that the steering process of the virtual vehicle satisfies the steering failure condition. That is, a steering result of the steering process of the virtual vehicle is predicted. In a case that the steering result is that the steering fails, the auxiliary steering logic is used to control the virtual vehicle to steer automatically. Exemplarily, in the steering process of the virtual vehicle, in a case that the virtual vehicle is predicted to hit a virtual obstacle after 10 seconds, the auxiliary steering logic is used to control the virtual vehicle to steer automatically, to prevent the virtual vehicle from colliding with the virtual obstacle.

In a case that the auxiliary steering logic starts to control the virtual vehicle to steer automatically, that is, in a case that the auxiliary steering logic enters an active state, the virtual vehicle has not failed to steer. However, considering that the virtual vehicle is predicted to fail to steer at a future point of time, the auxiliary steering logic needs to be activated, to avoid the steering failure of the virtual vehicle. The steering failure of the virtual vehicle refers to at least one of the following cases: the virtual vehicle colliding with a virtual obstacle, the virtual vehicle leaving the driving road, or the virtual vehicle colliding with another virtual vehicle.

In an embodiment, a control manner of the virtual vehicle is displayed on the direction control in a process of controlling the virtual vehicle to steer automatically by using the auxiliary steering logic. Exemplarily, in a case that the direction control is a joystick component, a joystick position is displayed on the joystick component. The joystick position is used for representing an input used to control the virtual vehicle to steer in a case that the virtual vehicle is controlled by the auxiliary steering logic to steer automatically. That is, in a case that the user moves a joystick in the joystick component to the aforementioned joystick position, the user can control the virtual vehicle to steer in a manner in which the auxiliary steering logic would control the virtual vehicle. Exemplarily, in a case that the direction control is a direction key, a target direction key is highlighted on the direction key. The target direction key is configured to represent the direction key used to control the virtual vehicle when the virtual vehicle is controlled by the auxiliary steering logic to steer automatically.

In an embodiment, the auxiliary steering logic is used to control the virtual vehicle to drive straight in a case that a straight driving process of the virtual vehicle satisfies a straight driving failure condition. The straight driving failure condition refers to a condition used for identifying a failure of the straight driving process of the virtual vehicle or occurrence of a steering failure of the virtual vehicle within a future time period. Exemplarily, in a case that the virtual vehicle is about to collide with the virtual obstacle, the auxiliary steering logic is used to control the virtual vehicle to drive straight. Exemplarily, in a case that the virtual vehicle is about to collide with another virtual vehicle in the virtual environment, the auxiliary steering logic is used to control the virtual vehicle to drive straight. Exemplarily, in a case that the virtual vehicle is about to leave the road in the virtual environment, the auxiliary steering logic is used to control the virtual vehicle to drive straight.

In a case that the auxiliary condition is not triggered, the virtual vehicle is operated by the user in person, and in a case that the auxiliary condition is triggered, the virtual vehicle is operated by using the auxiliary steering logic, which can not only retain operation fun and learning behaviors of the user, but also can help the user correct errors in time, thereby reducing the sense of frustration of the user and encouraging the user to learn.

Based on the above, according to this disclosure, in a case that the user controls the virtual vehicle to steer and the auxiliary condition is satisfied, the auxiliary steering logic is used to control the virtual vehicle to steer, and the user does not need to perform operations. Therefore, operation steps by the user can be effectively reduced, and repeated operations by the user is avoided, thereby improving human-computer interaction efficiency.

In the following embodiment, on one hand, in a case that the virtual vehicle steers, an automatic control prompt is displayed to help the user learn that the virtual vehicle is under the control of the auxiliary steering logic; on the other hand, an operation prompt is displayed to help the user learn a reason for the steering failure, which is convenient for the user to adjust next steering according to the reason for the steering failure, thereby improving skills of the user.

Figure 4:
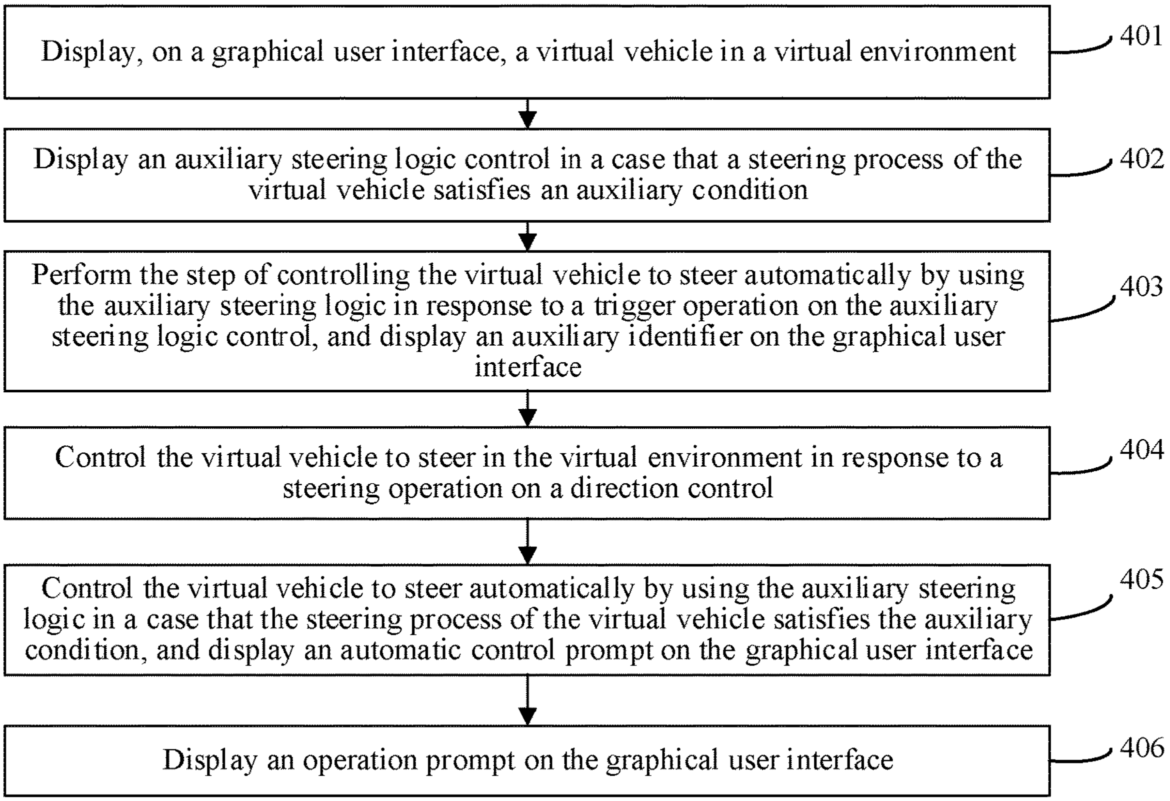
FIG. 4 is a schematic flowchart of a method for controlling a virtual vehicle according to an exemplary embodiment of this disclosure.

FIG. 4 is a flowchart of a method for controlling a virtual vehicle according to an exemplary embodiment of this disclosure. The method may be performed by the terminal 120 or the terminal 160 shown in FIG. 1. The method includes the following steps:

Step 401: Display, on a graphical user interface, a virtual vehicle in a virtual environment.

The virtual environment is obtained by performing observation in a virtual world from a first-person perspective or a third-person perspective in a process in which the application on the terminal is run. In this embodiment of this disclosure, the virtual environment is a picture in a case that the virtual vehicle is observed in the virtual world by using a camera model.

The virtual vehicle refers to a vehicle mainly controlled by a user in the virtual environment. The virtual vehicle is at least one of a virtual car, a virtual trailer, a virtual car train, a virtual moped, or a virtual motorcycle.

The virtual vehicle may also be another virtual vehicle such as a virtual ship and a virtual aircraft. The type of the virtual vehicle is not limited in this disclosure.

In an embodiment, the virtual vehicle is taken by a virtual character. The user controls the virtual vehicle through the virtual character.

Step 402: Display an auxiliary steering logic control in a case that a steering process of the virtual vehicle satisfies an auxiliary condition.

The auxiliary steering logic control is configured to activate or deactivate the auxiliary steering logic control. Exemplarily, in a case that the auxiliary steering logic control is in an activated state, the auxiliary steering logic control is deactivated in response to a trigger operation on the auxiliary steering logic control. Exemplarily, in a case that the auxiliary steering logic control is in a deactivated state, the auxiliary steering logic control is activated in response to the trigger operation on the auxiliary steering logic control.

In an embodiment, the auxiliary steering logic control is displayed on another graphical user interface. Exemplarily, the auxiliary steering logic control is displayed on a setting interface. The user may pre-enable auxiliary steering logic on the setting interface, and in this case, the terminal does not need to display the auxiliary steering logic control but directly activates the auxiliary steering logic in a case that the steering process of the virtual vehicle satisfies the auxiliary condition.

Step 403: Perform the step of controlling the virtual vehicle to steer automatically by using the auxiliary steering logic in response to a trigger operation on the auxiliary steering logic control, and display an auxiliary identifier on the graphical user interface.

The trigger operation is used for deactivating or activating the auxiliary steering logic. The trigger operation is to press one or more preset physical buttons to deactivate or activate the auxiliary steering logic, or the trigger operation may be a trigger operation performed through a signal generated by performing long-pressing, clicking, double-clicking and/or swiping on a designated area of a touch screen.

The auxiliary identifier is displayed on the graphical user interface in the running process of the auxiliary steering logic. The auxiliary identifier is used for indicating that the auxiliary steering logic is in an activated state. That is, in a case that the auxiliary condition is satisfied, the auxiliary steering logic controls the virtual vehicle to move.

In an embodiment, the auxiliary identifier is displayed at a peripheral position of the virtual vehicle in response to the trigger operation on the auxiliary steering logic control.

In an embodiment, the auxiliary identifier is displayed at a peripheral position of a driver avatar in the virtual vehicle in response to the trigger operation on the auxiliary steering logic control. Exemplarily, as shown in FIG. 3, an auxiliary identifier 306 is displayed above the head of the virtual character 302.

Step 404: Control the virtual vehicle to steer in the virtual environment in response to a steering operation on a direction control.

The direction control is configured to control a movement direction of the virtual vehicle. In an embodiment, the direction control is at least one of a joystick component, a steering wheel component, or a direction key.

In an embodiment, the virtual vehicle is controlled to drive straight in the virtual environment in response to a straight driving operation triggered on the direction control.

Step 405: Control the virtual vehicle to steer automatically by using the auxiliary steering logic in a case that the steering process of the virtual vehicle satisfies the auxiliary condition, and display an automatic control prompt on the graphical user interface.

The auxiliary condition is used for determining whether to enable the auxiliary steering logic to control the virtual vehicle. In an embodiment, the auxiliary condition refers to an activity failure condition. The activity failure condition includes at least one of the following events: the virtual vehicle failing to steer, the virtual vehicle failing to drive straight, the virtual vehicle failing to drift, the moving direction of the virtual vehicle inconsistent with a preset direction, the virtual vehicle colliding with a virtual obstacle, the current virtual vehicle colliding with another virtual vehicle, the speed of the virtual vehicle being less than a threshold, a distance between the virtual vehicle and a road boundary being less than a threshold, a failure occurring in the virtual vehicle, or another preset event.

In an embodiment, the auxiliary steering logic is used to control the virtual vehicle to steer automatically in a case that the steering process of the virtual vehicle satisfies a steering failure condition. The steering failure condition refers to a condition for predicting occurrence of a steering failure of the virtual vehicle.

Figure 5:
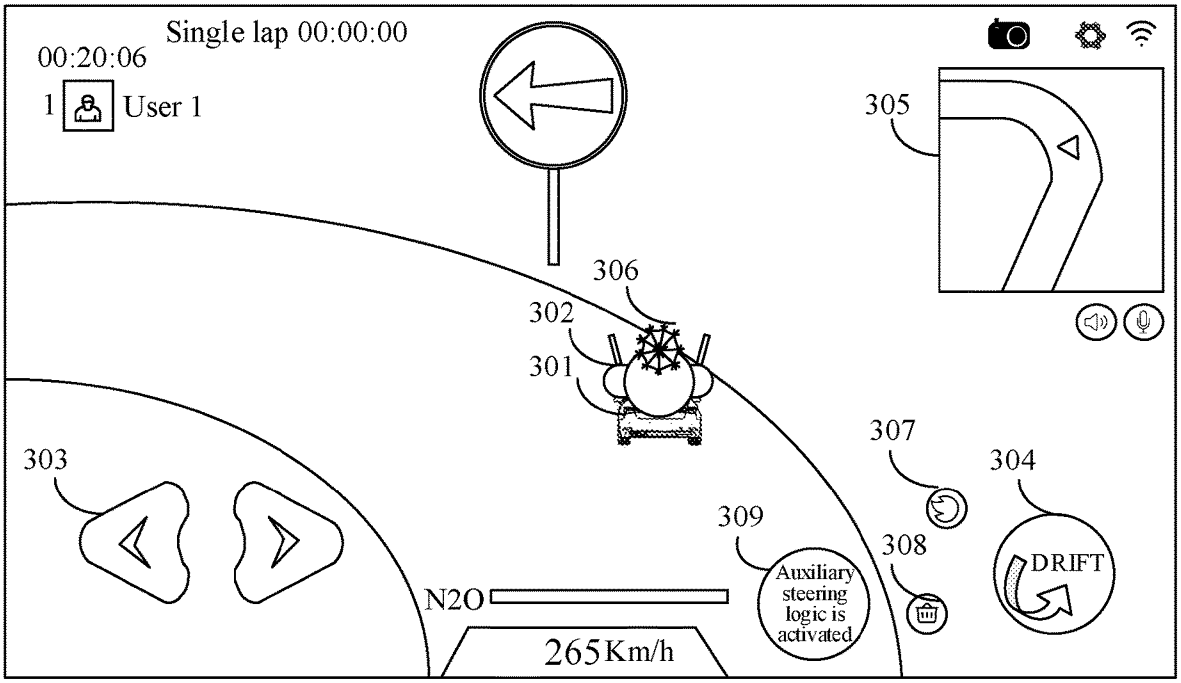
FIG. 5 is a schematic diagram of an interface of a method for controlling a virtual vehicle according to an exemplary embodiment of this disclosure.

The automatic control prompt represents that the auxiliary steering logic is in a starting state, that is, in a case that the virtual vehicle is controlled by the auxiliary steering logic, the automatic control prompt is displayed. In an embodiment, the automatic control prompt includes at least one of a pattern, a picture, a text, or a control. Exemplarily, as shown in FIG. 5, in a case that the virtual vehicle 301 is about to be in contact with a bend boundary (i.e., road bend boundary), the auxiliary steering logic is started, and an automatic control prompt 309 is displayed on the graphical user interface.

In an embodiment, the automatic control prompt is at least one of a sound prompt, a vibration prompt, or a flashing light prompt.

Step 406: Display an operation prompt on the graphical user interface.

The operation prompt is displayed on the graphical user interface in response to the virtual vehicle completing the steering, or the operation prompt is displayed on the graphical user interface in a case that the auxiliary steering logic is used to control the virtual vehicle to steer automatically.

The operation prompt is used for displaying a reason why the virtual vehicle fails to steer, or a reason why the virtual vehicle fails to steer within a future time period, so that the user learns the reason for the steering failure, which is convenient for the user to adjust next steering according to the reason for the steering failure, thereby improving skills of the user.

In an embodiment, the operation prompt includes at least one of a pattern, a picture, a text, or a control.

Figure 6:
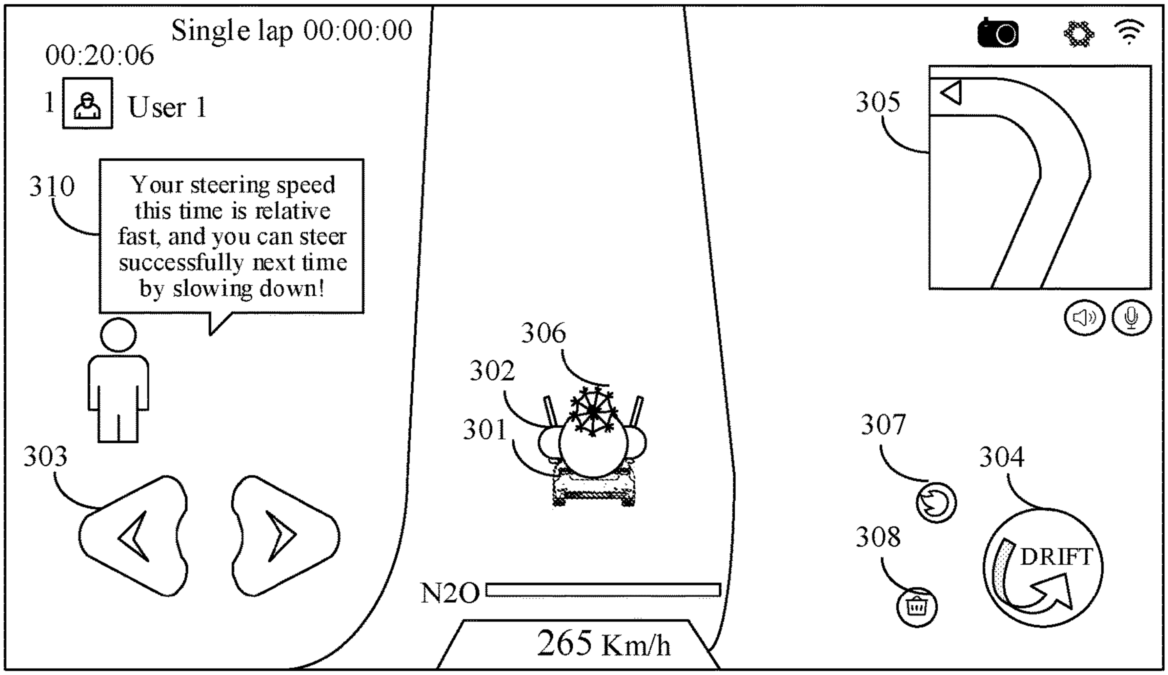
FIG. 6 is a schematic diagram of an interface of a method for controlling a virtual vehicle according to an exemplary embodiment of this disclosure.

Exemplarily, as shown in FIG. 6, after the virtual vehicle completes the steering, an operation prompt 310 is displayed on the graphical user interface. Display content of the operation prompt 310 is "Your steering speed this time is relative fast, and you can steer successfully next time by slowing down!". The display content is used for informing that the steering failure this time is caused by a relatively fast speed of the virtual vehicle.

The operation prompt may also be expressed by voice. Exemplarily, the scenario shown in FIG. 6 is still used as an example for description. In a case that the operation prompt 310 is displayed, voice of "Your steering speed this time is relative fast, and you can steer successfully next time by slowing down!" is simultaneously outputted.

Based on the above, according to this disclosure, in a case that the user controls the virtual vehicle to steer and the auxiliary condition is satisfied, the auxiliary steering logic is used to control the virtual vehicle to steer, and the user does not need to perform operations. Therefore, operation steps by the user can be effectively reduced, and repeated operations by the user is avoided, thereby improving human-computer interaction efficiency.

Moreover, for those users who have just started to control the virtual vehicles, since the users personally operate the virtual vehicles in a case that the auxiliary condition is not triggered, it is guaranteed that the users can experience the fun of controlling the virtual vehicles and learn the skills of controlling the virtual vehicles. In addition, in a case that the auxiliary condition is satisfied, the auxiliary steering logic is used to control the virtual vehicle to move, to avoid steering failures caused by operational errors of the users, thereby reducing the sense of frustration of the users.

In the following embodiments, on one hand, a condition under which the virtual vehicle fails to steer or the virtual vehicle fails to steer within a future time period is provided, and a basis for determining the auxiliary condition is provided, so that the auxiliary steering logic can be started at an accurate point of time, to better control the virtual vehicle to steer; and on the other hand, logic for the auxiliary steering logic to control the virtual vehicle is provided, so that the auxiliary steering logic can accurately control the virtual vehicle, to avoid that the virtual vehicle fails to steer.

Figure 7:
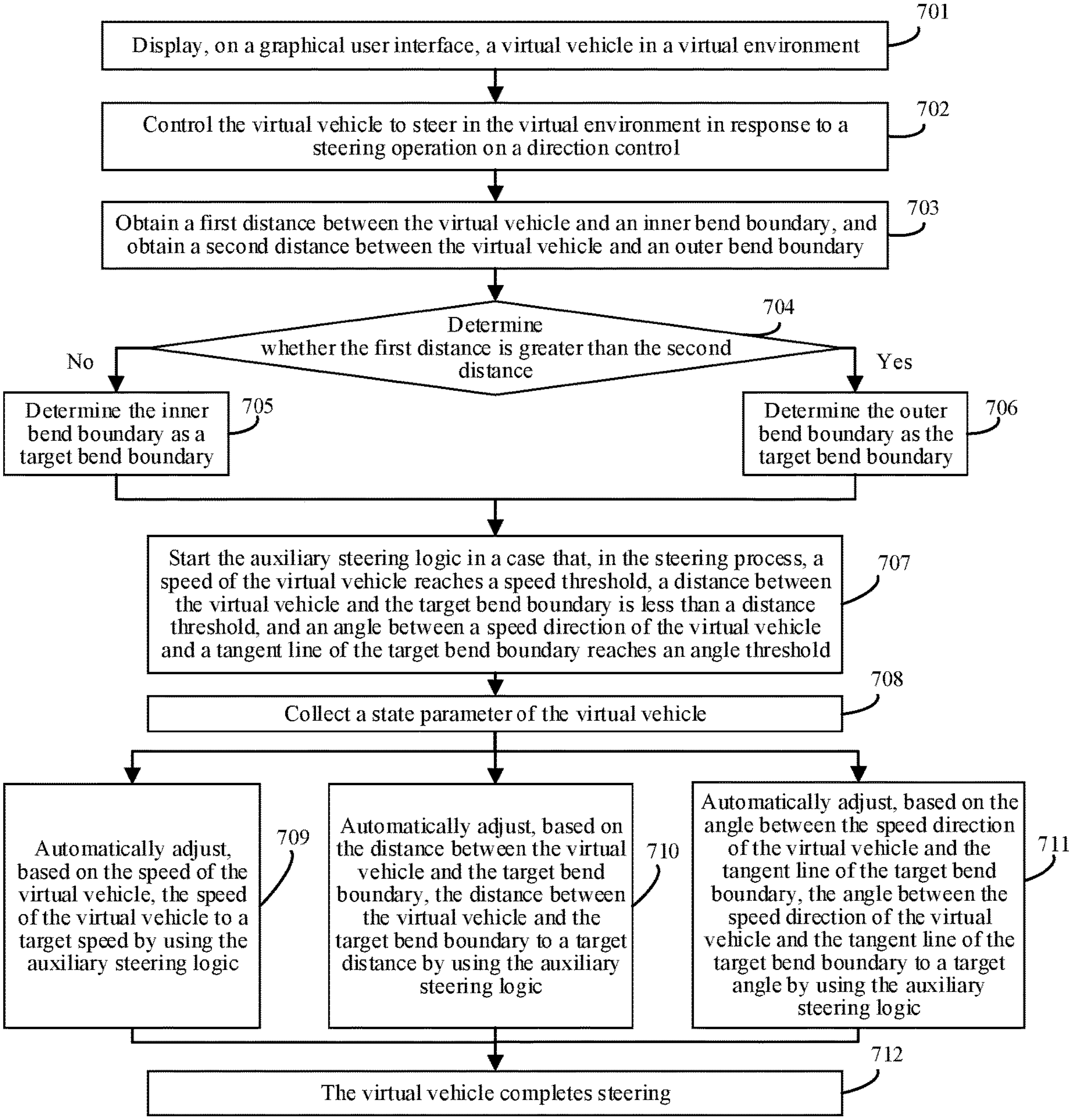
FIG. 7 is a schematic flowchart of a method for controlling a virtual vehicle according to an exemplary embodiment of this disclosure.

FIG. 7 is a flowchart of a method for controlling a virtual vehicle according to an exemplary embodiment of this disclosure. The method may be performed by the terminal 120 or the terminal 160 shown in FIG. 1. The method includes the following steps:

Step 701: Display, on a graphical user interface, a virtual vehicle in a virtual environment.

The virtual environment is obtained by performing observation in a virtual world from a first-person perspective or a third-person perspective in a process in which the application on the terminal is run. In this embodiment of this disclosure, the virtual environment is a picture in a case that the virtual vehicle is observed in the virtual world by using a camera model.

The virtual vehicle refers to a vehicle mainly controlled by a user in the virtual environment. The virtual vehicle is at least one of a virtual car, a virtual trailer, a virtual car train, a virtual moped, or a virtual motorcycle.

A direction control is configured to control a movement direction of the virtual vehicle. In an embodiment, the direction control is at least one of a joystick component, a steering wheel component, or a direction key.

Step 702: Control the virtual vehicle to steer in the virtual environment in response to a steering operation on the direction control.

The steering operation is used for controlling the virtual vehicle to steer in the virtual environment. The steering operation is to press one or more preset physical buttons to control the virtual vehicle to steer in the virtual environment, or the steering operation may be a steering operation performed through a signal generated by performing long-pressing, clicking, double-clicking and/or swiping on a designated area of a touch screen.

Step 703: Obtain a first distance between the virtual vehicle and an inner bend boundary, and obtain a second distance between the virtual vehicle and an outer bend boundary.

The first distance is a shortest distance from the virtual vehicle to the inner bend boundary, and the second distance is a shortest distance from the virtual vehicle to the outer bend boundary.

Since bend boundaries include the inner bend boundary and the outer bend boundary, it is necessary to consider which side of the bend boundary the virtual vehicle collides with in a case that the virtual vehicle steers, to correspondingly adjust the virtual vehicle.

Step 704: Determine whether the first distance is greater than the second distance.

Step 705 is performed in a case that the first distance is not greater than the second distance; and Step 706 is performed in a case that the first distance is greater than the second distance.

Step 705: Determine the inner bend boundary as a target bend boundary.

The target bend boundary refers to the bend boundary close to the virtual vehicle.

The terminal determines the inner bend boundary as the target bend boundary, or the server determines the inner bend boundary as the target bend boundary.

Figure 8:
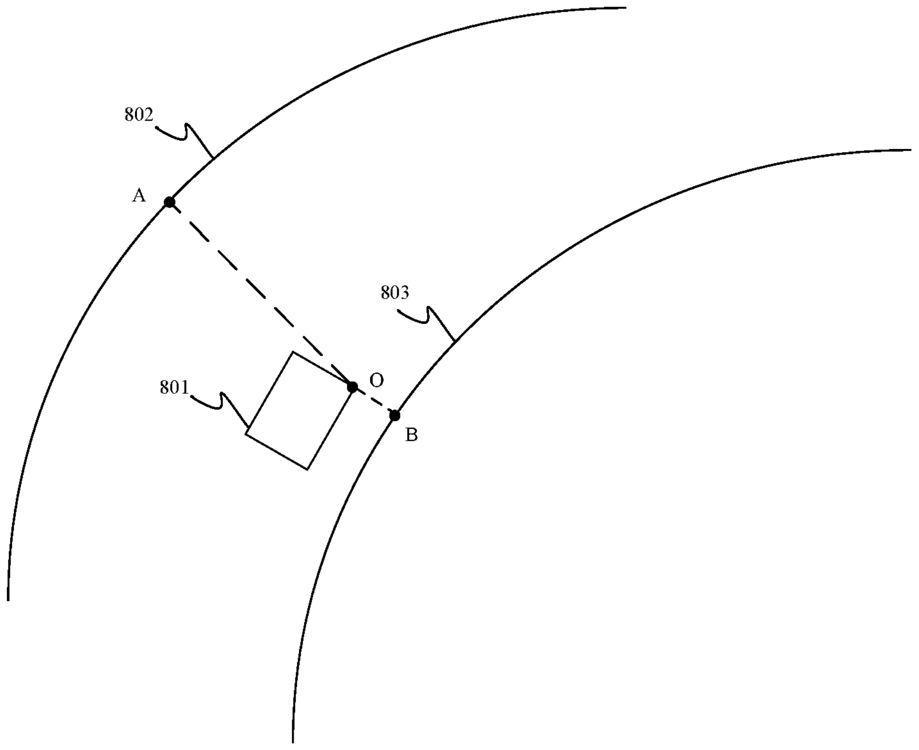
FIG. 8 is a schematic diagram of determining a distance according to an exemplary embodiment of this disclosure.

Exemplarily, as shown in FIG. 8, a distance from a virtual vehicle 801 to an inner bend boundary 803 is a length of a line segment OB, a distance from the virtual vehicle 801 to an outer bend boundary 802 is a length of a line segment OB, and OA is greater than OB, so the inner bend boundary is determined as the target bend boundary.

Step 706: Determine the outer bend boundary as the target bend boundary.

The terminal determines the outer bend boundary as the target bend boundary, or the server determines the outer bend boundary as the target bend boundary.

Step 707: Start the auxiliary steering logic in a case that, in the steering process, a speed of the virtual vehicle reaches a speed threshold, a distance between the virtual vehicle and the target bend boundary is less than a distance threshold, and an angle between a speed direction of the virtual vehicle and a tangent line of the target bend boundary reaches an angle threshold.

The speed threshold is set by a user or a technician. In a case that the speed of the virtual vehicle is greater than the speed threshold, it is easy to cause a steering failure of the virtual vehicle. In a case that the speed of the virtual vehicle is less than the speed threshold, the virtual vehicle is more likely to steer successfully. Exemplarily, the speed threshold is set to be 10 km/h (kilometer/per hour).

In an embodiment, the speed of the virtual vehicle is displayed on the graphical user interface.

In an embodiment, the speed of the virtual vehicle is calculated by calculating a distance traveled by the virtual vehicle within a unit time. Exemplarily, in a case that the virtual vehicle travels for a distance of 6 km within 1 hour, the speed of the virtual vehicle is 6 km/h.

The distance threshold is set by a user or a technician. In a case that the distance between the virtual vehicle and the bend boundary is less than the distance threshold, it is easy to cause a steering failure of the virtual vehicle. In a case that the distance between the virtual vehicle and the bend boundary is greater than the distance threshold, the virtual vehicle is more likely to steer successfully. Exemplarily, the distance threshold is set to be 10 m (meters).

In an embodiment, the distance between the virtual vehicle and the bend boundary refers to a shortest distance from a feature point of the virtual vehicle to the bend boundary. The feature point includes at least one of a center of gravity, a center of mass, an inner center, an outer center, a preset point on a surface of the virtual vehicle, or a preset point inside the virtual vehicle. Exemplarily, as shown in FIG. 8, a point O on the virtual vehicle 801 is used as the feature point, and line segments with shortest distances are drawn from the point O to the outer bend boundary 802 and to the inner bend boundary 803, to obtain the line segment OA and the line segment OB. The line segment OA represents a shortest distance from the point O to the outer bend boundary 802, and the line segment OB represents a shortest distance from the point O to the inner bend boundary 803.

In an embodiment, the terminal or the server obtains the distance between the virtual vehicle and the bend boundary. Exemplarily, the obtaining process includes the following sub-steps: drawing a straight line perpendicular to the speed direction of the virtual vehicle from the feature point of the virtual vehicle, to obtain an intersection point of the straight line and the bend boundary; and determining a distance between the intersection point and the feature point as the distance between the foregoing virtual vehicle and the bend boundary. Exemplarily, in a case that the feature point is a point on the head of the virtual vehicle, a straight line perpendicular to the speed direction is drawn from the feature point, and the line intersects the bend boundary to obtain an intersection point. The distance between the intersection point and the feature point is used as the distance between the virtual vehicle and the bend boundary.

The angle threshold is set by a user or a technician. In a case that the angle between the speed direction of the virtual vehicle and the tangent line of the bend boundary is greater than the angle threshold, it is easy to cause a steering failure of the virtual vehicle. In a case that the angle between the speed direction of the virtual vehicle and the tangent line of the bend boundary is less than the angle threshold, the virtual vehicle is more likely to steer successfully. Exemplarily, the angle threshold is set to be 0 degree.

In an embodiment, the angle between the speed direction of the virtual vehicle and the tangent line of the bend boundary is an acute angle or a right angle.

Figure 9:
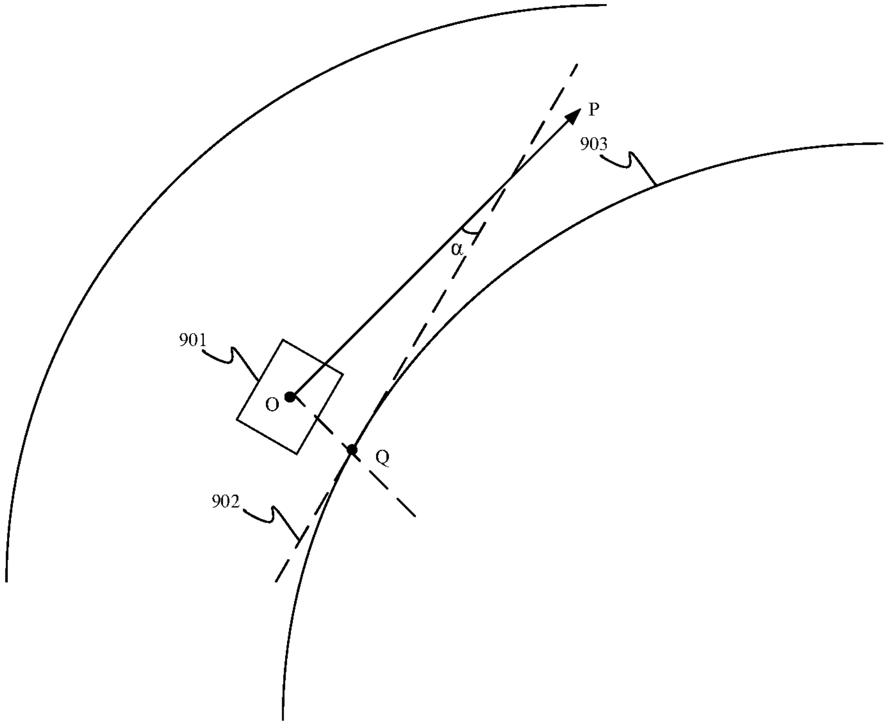
FIG. 9 is a schematic diagram of determining an angle according to an exemplary embodiment of this disclosure.

In an embodiment, the terminal or the server determines the tangent line of the bend boundary. Exemplarily, the process includes the following sub-steps: drawing a straight line perpendicular to the speed direction of the virtual vehicle from the feature point of the virtual vehicle, to obtain an intersection point of the straight line and the bend boundary; and drawing a tangent line of the bend boundary by passing through the intersection point. Exemplarily, as shown in FIG. 9, a feature point on a virtual vehicle 901 is a point O, and a ray OP represents a speed direction of the virtual vehicle 901. A straight line perpendicular to the ray OP is drawn from the point O, and the straight line intersects an inner bend boundary 903 (only the angle between the speed direction and the inner bend boundary is used as an example for description herein, and the obtaining process of the angle between the speed direction and the outer bend boundary is the same as the obtaining process of the angle between the speed direction and the inner bend boundary, so this is not repeated again herein) at a point Q. A tangent line

902 of the inner bend boundary 903 is drawn by passing through the point Q, and then an angle α between the tangent line 902 and the ray OP is obtained.

Figure 10:
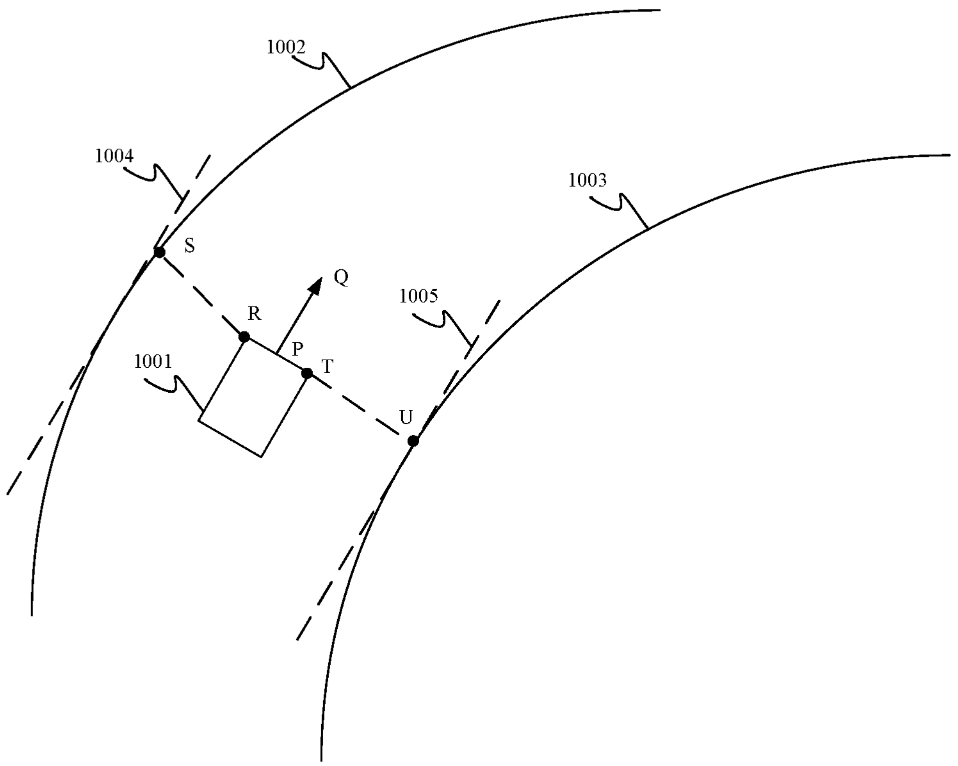
FIG. 10 is a schematic diagram in which auxiliary steering logic is not enabled according to an exemplary embodiment of this disclosure.

Exemplarily, as shown in FIG. 10, a speed of a virtual vehicle 1001 does not reach the speed threshold; a distance between the virtual vehicle 1001 and a bend boundary 1002 is a line segment SR, and a distance between the virtual vehicle 1001 and a bend boundary 1003 is a line segment TU, where both the line segment SR and the line segment TU are smaller than the distance threshold; a ray PQ represents a moving direction of the virtual vehicle 1001, where the ray PQ is parallel to a tangent line 1004 of the bend boundary 1002, and the ray PQ is parallel to a tangent line 1005 of the bend boundary 1003. Therefore, an angle between the speed direction of the virtual vehicle 1001 and the tangent line of the bend boundary does not reach the angle threshold, and in this case, the auxiliary steering logic is not triggered.

Step 708: Collect a state parameter of the virtual vehicle.

The state parameter includes at least one of the speed of the virtual vehicle, the distance between the virtual vehicle and the target bend boundary, or the angle between the speed direction of the virtual vehicle and the tangent line of the target bend boundary. The auxiliary steering logic controls the virtual vehicle correspondingly according to the state parameter.

In an embodiment, the state parameter of the virtual vehicle is adjusted by using the auxiliary steering logic, to control the virtual vehicle to steer automatically.

Figure 11:
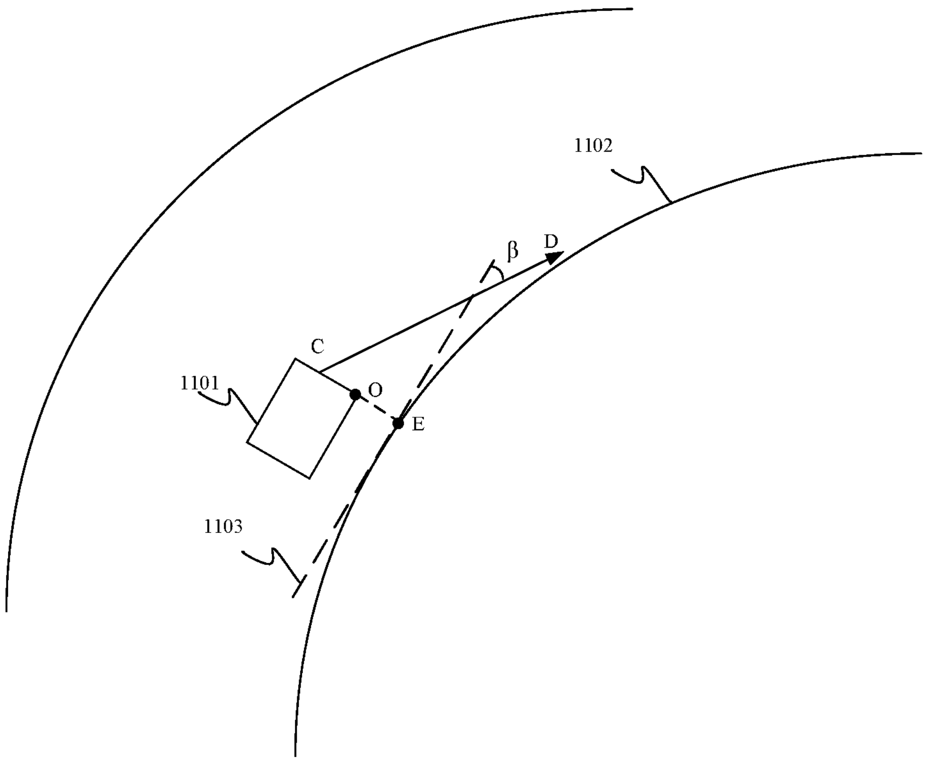
FIG. 11 is a schematic diagram of steering near an inner bend boundary according to an exemplary embodiment of this disclosure.

Exemplarily, as shown in FIG. 11, a virtual vehicle 1101 steers at a position close to an inner bend boundary 1102; a speed of the virtual vehicle 1101 reaches the speed threshold, and a distance between the virtual vehicle 1101 and the inner bend boundary 1102 is a line segment OE, where the line segment OE is less than the distance threshold; and a ray CD represents a speed direction of the virtual vehicle 1101, and an angle between the ray CD and a tangent line 1103 of the inner bend boundary 1102 is β, where β reaches the angle threshold. In this case, the virtual vehicle 1101 is controlled by the auxiliary steering logic. Since the virtual vehicle 1101 is close to the inner bend boundary, a state parameter of the virtual vehicle includes at least the speed of the virtual vehicle 1101, the distance OE between the virtual vehicle 1101 and the inner bend boundary 1102, and the angle β between the speed direction of the virtual vehicle 1101 and the tangent line 1103 of the inner bend boundary 1102.

Figure 12:
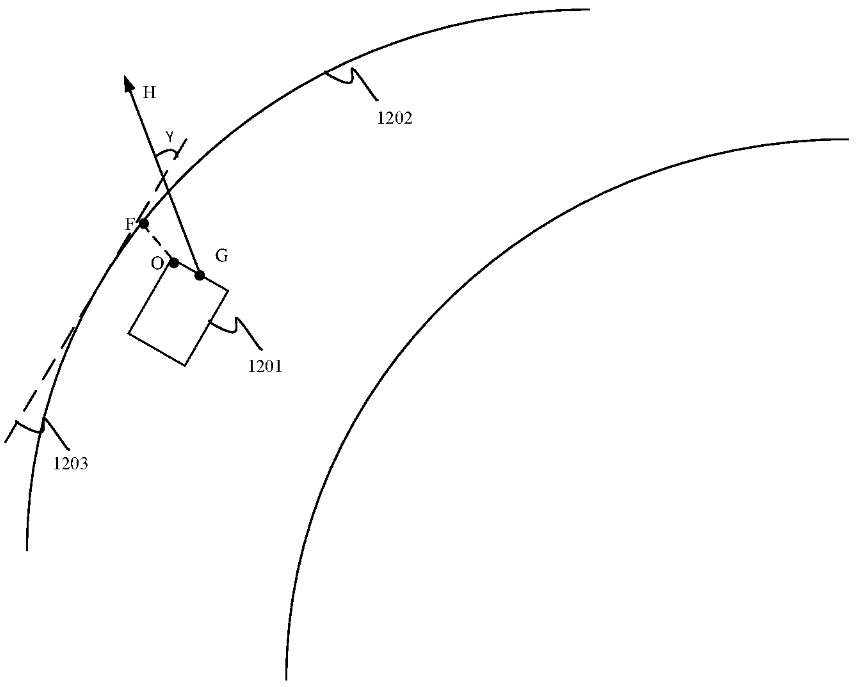
FIG. 12 is a schematic diagram of steering near an outer bend boundary according to an exemplary embodiment of this disclosure.

Exemplarily, as shown in FIG. 12, a virtual vehicle 1201 steers at a position close to an outer bend boundary 1202; a speed of the virtual vehicle 1201 reaches the speed threshold, and a distance between the virtual vehicle 1201 and the outer bend boundary 1202 is a line segment OF, where the line segment OF is less than the distance threshold; and a ray GH represents a speed direction of the virtual vehicle 1201, and an angle between the ray GH and a tangent line 1203 of the outer bend boundary 1202 is γ, where γ reaches the angle threshold. In this case, the virtual vehicle 1201 is controlled by the auxiliary steering logic. Since the virtual vehicle 1201 is close to the outer bend boundary, a state parameter of the virtual vehicle includes at least the speed of the virtual vehicle 1201, the distance OF between the virtual vehicle 1201 and the inner bend boundary 1202, and the angle γ between the speed direction of the virtual vehicle 1201 and the tangent line 1203 of the outer bend boundary 1202.

Step 709: Automatically adjust, based on the speed of the virtual vehicle, the speed of the virtual vehicle to a target speed by using the auxiliary steering logic.

In a case that the state parameter includes the speed of the virtual vehicle, based on the speed of the virtual vehicle, the speed of the virtual vehicle is automatically adjusted to the target speed by using the auxiliary steering logic.

The target speed is determined according to the angle between the speed direction of the virtual vehicle and the tangent line of the target bend boundary. In a case that the virtual vehicle drives at the target speed, the virtual vehicle is more like to steer successfully.

In an embodiment, the target speed is obtained by substituting the angle between the speed direction of the virtual vehicle and the tangent line of the target bend boundary into a preset function formula. Exemplarily, the preset function formula is a linear function y=kx+b, where k and b are any real numbers, x represents the angle between the speed direction of the virtual vehicle and the tangent line of the target bend boundary, and y represents the target speed.

In an embodiment, the target speed is obtained by querying a list of relationships between angles and target speeds. Exemplarily, as shown in Table 1:

TABLE 1

List of relationships between angles and target speeds

| Angle (degree) | Target speed (km/h) |
|---|---|
| 10 | 95 |
| 9 | 90 |
| 8 | 85 |
| 7 | 80 |
| 6 | 75 |

In an embodiment, in a case that the state parameter includes the speed of the virtual vehicle, based on the speed of the virtual vehicle, the speed of the virtual vehicle is automatically adjusted to be less than the target speed by using the auxiliary steering logic.

Exemplarily, in a case that the angle between the speed direction of the virtual vehicle and the tangent line of the target bend boundary is 8 degrees, the target speed is determined to be 60 km/h; and in a case that the angle between the speed direction of the virtual vehicle and the tangent line of the target bend boundary is 16 degrees, the target speed is determined to be 50 km/h.

Step 710: Automatically adjust, based on the distance between the virtual vehicle and the target bend boundary, the distance between the virtual vehicle and the target bend boundary to a target distance by using the auxiliary steering logic.

In a case that the state parameter includes the distance between the virtual vehicle and the target bend boundary, based on the distance between the virtual vehicle and the target bend boundary, the distance between the virtual vehicle and the target bend boundary is automatically adjusted to the target distance by using the auxiliary steering logic.

The target distance is determined according to the angle between the speed direction of the virtual vehicle and the tangent line of the target bend boundary. Exemplarily, in a case that the angle between the speed direction of the virtual vehicle and the tangent line of the target bend boundary is 15 degrees, the target distance is determined to be 4 m; and in a case that the angle between the speed direction of the virtual vehicle and the tangent line of the target bend boundary is 4 degrees, the target distance is determined to be 8 m.

In an embodiment, the target distance is obtained by substituting the angle between the speed direction of the virtual vehicle and the tangent line of the target bend boundary into a preset function formula. Exemplarily, the preset function formula is a linear function y=kx+b, where k and b are any real numbers, x represents the angle between the speed direction of the virtual vehicle and the tangent line of the target bend boundary, and y represents the target distance. Exemplarily, the preset function formula is a function $y=ax^2+bx+c$, where a, b, and c are any real numbers, x represents the angle between the speed direction of the virtual vehicle and the tangent line of the target bend boundary, and y represents the target distance.

In an embodiment, the target distance is obtained by querying a list of relationships between angles and target distances. Exemplarily, as shown in Table 2:

TABLE 2

List of relationships between angles and target distances

| Angle (degree) | Target distance (m) |
|---|---|
| 10 | 20 |
| 9 | 18 |
| 8 | 16 |
| 7 | 14 |
| 6 | 12 |

In an embodiment, the target distance is determined according to the speed of the virtual vehicle. Exemplarily, in a case that the speed of the virtual vehicle is 40 km/h, the target distance is determined to be 6 m; and in a case that the speed of the virtual vehicle is 70 km/h, the target distance is determined to be 9 m.

In an embodiment, the target distance is obtained by substituting the speed of the virtual vehicle into a preset function formula. Exemplarily, the preset function formula is a linear function y=kx+b, where k and b are any real numbers, x represents the speed of the virtual vehicle, and y represents the target distance. Exemplarily, the preset function formula is a function $y=ax^2+bx+c$, where a, b, and c are any real numbers, x represents the speed of the virtual vehicle, and y represents the target distance.

In an embodiment, in response to the distance between the virtual vehicle and the target bend boundary being less than the distance threshold, the auxiliary steering logic controls the speed direction of the virtual vehicle to be changed from a first direction to a second direction. The first direction is a speed direction of the virtual vehicle before the auxiliary steering logic is started, and the second direction is a direction in which the virtual vehicle is away from the target bend boundary. In addition, the auxiliary steering logic controls the speed of the virtual vehicle to be reduced.

Step 711: Automatically adjust, based on the angle between the speed direction of the virtual vehicle and the tangent line of the target bend boundary, the angle between the speed direction of the virtual vehicle and the tangent line of the target bend boundary to a target angle by using the auxiliary steering logic.

In a case that the state parameter includes the angle between the speed direction of the virtual vehicle and the tangent line of the target bend boundary, based on the angle between the speed direction of the virtual vehicle and the tangent line of the target bend boundary, the angle between the speed direction of the virtual vehicle and the tangent line of the target bend boundary is automatically adjusted to the target angle by using the auxiliary steering logic.

In an embodiment, the target angle is determined according to the speed of the virtual vehicle. Exemplarily, in a case that the speed of the virtual vehicle is 40 km/h, the target angle is determined to be 5 degrees; and in a case that the speed of the virtual vehicle is 70 km/h, the target angle is determined to be 9 degrees.

In an embodiment, the target angle is obtained by substituting the speed of the virtual vehicle into a preset function formula. Exemplarily, the preset function formula is a linear function y=kx+b, where k and b are any real numbers, x represents the speed of the virtual vehicle, and y represents the target angle.

In an embodiment, the target angle is obtained by querying a list of relationships between speeds and target angles. Exemplarily, as shown in Table 3:

TABLE 3

List of relationships between speeds and target angles

| Speed (km/h) | Target angle (degree) |
|---|---|
| 60 | 3 |
| 50 | 5 |
| 40 | 7 |
| 30 | 9 |
| 20 | 11 |

In an embodiment, the target angle is determined according to the distance between the virtual vehicle and the target bend boundary. Exemplarily, in a case that the distance between the virtual vehicle and the target bend boundary is 10 m, the target angle is determined to be 5 degrees; and in a case that the distance between the virtual vehicle and the target bend boundary is 15 m, the target angle is determined to be 9 degrees In an embodiment, the target angle is obtained by substituting the distance between the virtual vehicle and the target bend boundary into a preset function formula. Exemplarily, the preset function formula is a linear function y=kx+b, where k and b are any real numbers, x represents the distance between the virtual vehicle and the target bend boundary, and y represents the target angle.

In an embodiment, the target angle is obtained by querying a list of relationships between distances and target angles.

Step 712: The virtual vehicle completes steering.

The auxiliary steering logic controls the virtual vehicle to complete the steering.

Based on the above, according to this disclosure, in a case that the user controls the virtual vehicle to steer and the auxiliary condition is satisfied, the auxiliary steering logic is used to control the virtual vehicle to steer, and the user does not need to perform operations. Therefore, operation steps by the user can be effectively reduced, and repeated operations by the user is avoided, thereby improving human-computer interaction efficiency.

Moreover, for those users who have just started to control the virtual vehicles, it is guaranteed that the users can experience the fun of controlling the virtual vehicles and learn the skills of controlling the virtual vehicles. In addition, in a case that the auxiliary condition is satisfied, the auxiliary steering logic is used to control the virtual vehicle, to adjust the virtual vehicle in time, thereby reducing the sense of frustration of the users.

Figure 13:
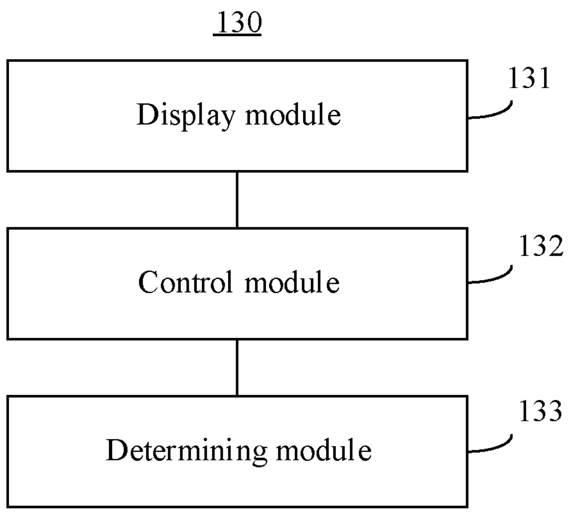
FIG. 13 is a schematic structural diagram of an apparatus for controlling a virtual vehicle according to an exemplary embodiment of this disclosure.

FIG. 13 is a schematic structural diagram of an apparatus for controlling a virtual vehicle according to an exemplary embodiment of this disclosure. The apparatus may be implemented as an entire computer device or a part of the computer device by using software, hardware, or a combination thereof. The apparatus 130 includes:

- a display module 131, configured to display, on a graphical user interface, a virtual vehicle in a virtual environment; and
- a control module 132, configured to: control the virtual vehicle to steer in the virtual environment in response to a steering operation; and
- control the virtual vehicle to steer automatically by using auxiliary steering logic in a case that a steering process of the virtual vehicle satisfies an auxiliary condition.

In an embodiment of this disclosure, the control module 132 is further configured to control the virtual vehicle to steer automatically by using the auxiliary steering logic in a case that the steering process of the virtual vehicle satisfies a steering failure condition, where the steering failure condition refers to a condition for predicting occurrence of a steering failure of the virtual vehicle.

In an embodiment of this disclosure, the control module 132 is further configured to: start the auxiliary steering logic in a case that, in the steering process, a speed of the virtual vehicle reaches a speed threshold, a distance between the virtual vehicle and a target bend boundary is less than a distance threshold, and an angle between a speed direction of the virtual vehicle and a tangent line of the target bend boundary reaches an angle threshold; and adjust a state parameter of the virtual vehicle by using the auxiliary steering logic, to control the virtual vehicle to steer automatically.

In an embodiment of this disclosure, the control module 132 is further configured to automatically adjust, based on the speed of the virtual vehicle, the speed of the virtual vehicle to a target speed by using the auxiliary steering logic, where the target speed is determined according to the angle between the speed direction of the virtual vehicle and the tangent line of the target bend boundary.

In an embodiment of this disclosure, the control module 132 is further configured to automatically adjust, based on the distance between the virtual vehicle and the target bend boundary, the distance between the virtual vehicle and the target bend boundary to a target distance by using the auxiliary steering logic.

In an embodiment of this disclosure, the control module 132 is further configured to automatically adjust, based on the angle between the speed direction of the virtual vehicle and the tangent line of the target bend boundary, the angle between the speed direction of the virtual vehicle and the tangent line of the target bend boundary to a target angle by using the auxiliary steering logic.

In an embodiment of this disclosure, the apparatus 130 further includes a determining module 133.

The determining module 133 is configured to: obtain a first distance between the virtual vehicle and the outer bend boundary, and obtain a second distance between the virtual vehicle and the outer bend boundary; and determine the bend boundary corresponding to a smaller one of the first distance and the second distance as the target bend boundary.

In an embodiment of this disclosure, the display module 131 is further configured to: display an auxiliary steering logic control in a case that the steering process of the virtual vehicle satisfies the auxiliary condition; and perform the step of controlling the virtual vehicle to steer automatically by using the auxiliary steering logic in response to a trigger operation on the auxiliary steering logic control.

In an embodiment of this disclosure, the display module 131 is further configured to display an auxiliary identifier on the graphical user interface in a running process of the auxiliary steering logic, where the auxiliary identifier is used for indicating that the auxiliary steering logic is in an activated state.

In an embodiment of this disclosure, the display module 131 is further configured to display the auxiliary identifier at a peripheral position of the virtual vehicle in the running process of the auxiliary steering logic; or display the auxiliary identifier at a peripheral position of a driver avatar in the virtual vehicle in the running process of the auxiliary steering logic.

In an embodiment of this disclosure, the display module 131 is further configured to display an operation prompt on the graphical user interface, where the operation prompt is used for displaying a reason why the virtual vehicle fails to steer, or a reason why the virtual vehicle fails to steer within a future time period.

In an embodiment of this disclosure, a direction control is further displayed on the graphical user interface; and the display module 131 is further configured to display a control manner of the virtual vehicle on the direction control in a process of controlling the virtual vehicle to steer automatically by using the auxiliary steering logic.

In an embodiment of this disclosure, the auxiliary steering logic is an auxiliary steering model, and the control module 132 is further configured to: obtain a position and the speed of the virtual vehicle in a case that the steering process of the virtual vehicle satisfies the auxiliary condition; performing data processing on the position and speed of the virtual vehicle by using the auxiliary steering model, to obtain a target position and the target speed of the virtual vehicle; and control the virtual vehicle to steer according to the target position and the target speed of the virtual vehicle.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Based on the above, according to this disclosure, in a case that the user controls the virtual vehicle to steer and the auxiliary condition is satisfied, the auxiliary steering logic is used to control the virtual vehicle to steer, and the user does not need to perform operations. Therefore, operation steps by the user can be effectively reduced, and repeated operations by the user is avoided, thereby improving human-computer interaction efficiency.

Figure 14:
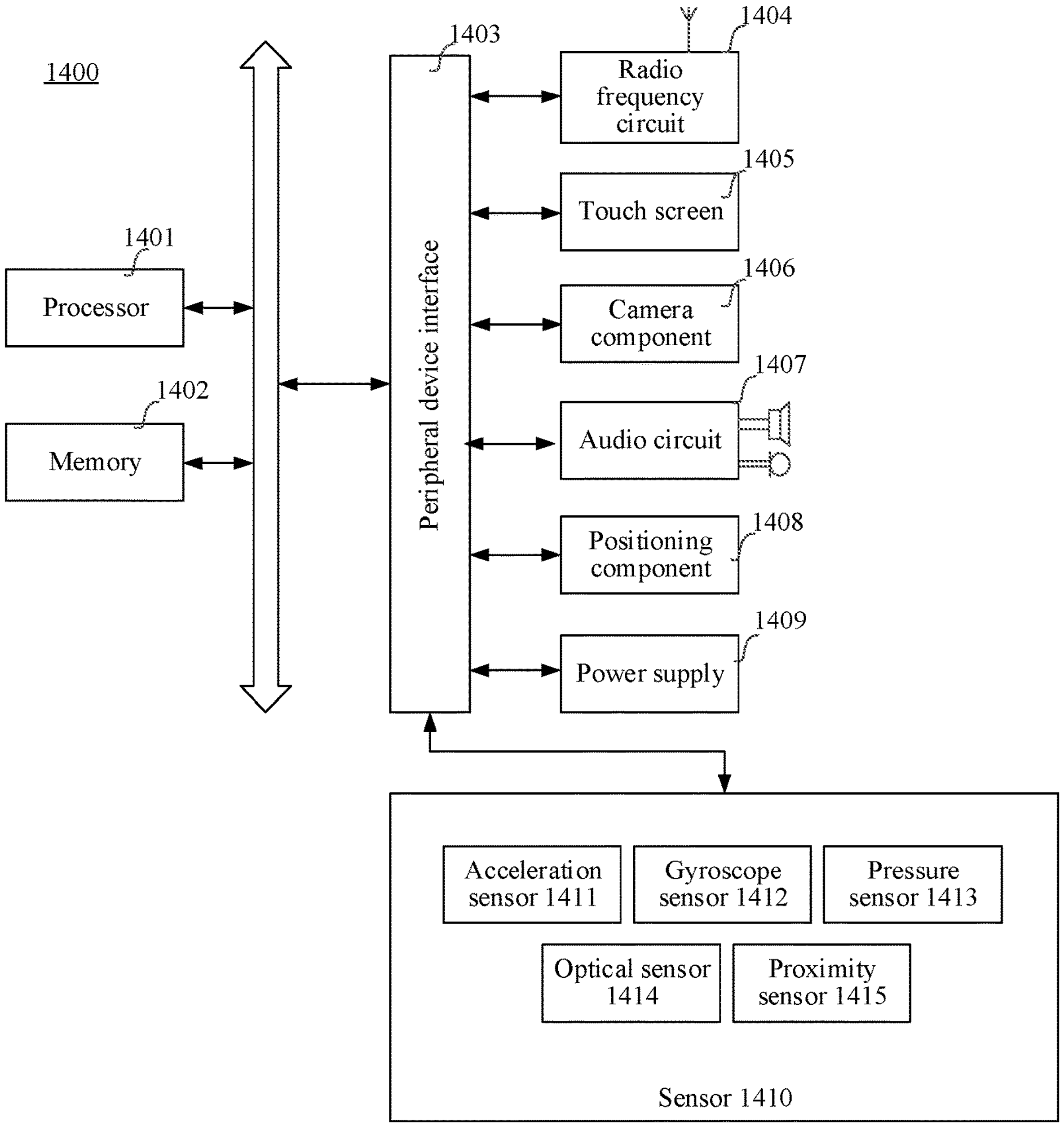
FIG. 14 is a structural block diagram of a terminal according to another exemplary embodiment of this disclosure.

FIG. 14 is a structural block diagram of a terminal 1400 according to an exemplary embodiment of this disclosure. The terminal 1400 may be a portable mobile terminal such as a smart phone, a tablet computer, a moving picture experts group audio layer III (MP3) player, and a moving picture experts group audio layer IV (MP4) player. The terminal 1400 may also be referred to as another name such as user equipment and a portable terminal.

Generally, a terminal 1400 includes a processor 1401 (including processing circuitry) and a memory 1402 (including a non-transitory computer-readable storage medium).

The processor 1401 may include one or more processing cores such as a 4-core processor or an 8-core processor. The processor 1401 may be implemented by using at least one hardware form of a digital signal processor (DSP), a field-programmable gate array (FPGA), and a programmable logic array (PLA). The processor 1401 may also include a main processor and a coprocessor. The main processor is configured to process data in a wake-up state, which is also referred to as a central processing unit (CPU). The coprocessor is configured to process data in a standby state with low power consumption. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process a computing operation related to machine learning.

The memory 1402 may include one or more computer-readable storage media. The computer-readable storage medium may be tangible and non-transient. The memory 1402 may further include a high-speed random access memory and a non-volatile memory, for example, one or more disk storage devices or flash storage devices. In some embodiments, the non-transitory computer-readable storage medium in the memory 1402 is configured to store at least one instruction, the at least one instruction being executed by the processor 1401 to implement the method provided in the embodiments of this disclosure.

In some embodiments, the terminal 1400 may further include: a peripheral device interface 1403 and at least one peripheral device. Specifically, the peripheral device includes: at least one of a radio frequency (RF) circuit 1404, a touch display screen 1405, a camera assembly 1406, an audio circuit 1407, a positioning component 1408, or a power supply 1409.

In some embodiments, the terminal 1400 further includes one or more sensors 1410. The one or more sensors 1410 include, but are not limited to: an acceleration sensor 1411, a gyroscope sensor 1412, a pressure sensor 1413, an optical sensor 1414, and a proximity sensor 1415.

A person skilled in the art may understand that the structure shown in FIG. 14 does not constitute a limitation to the terminal 1400, and the terminal may include more components or fewer components than those shown in the figure, or some components may be combined, or a different component deployment may be used.

An embodiment of this disclosure further provides a computer-readable storage medium, storing at least one instruction, the at least one instruction being loaded and executed by a processor to implement the method for controlling a virtual vehicle described in the foregoing various embodiments.

According to an aspect of this disclosure, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to implement the method for controlling a virtual vehicle provided in the various optional implementations in the foregoing aspects.

The foregoing disclosure includes some exemplary embodiments of this disclosure which are not intended to limit the scope of this disclosure. Other embodiments shall also fall within the scope of this disclosure.

What is claimed is:

1. A method for controlling a virtual vehicle, the method comprising:

controlling display, on a graphical user interface, of the virtual vehicle in a virtual environment;

controlling the virtual vehicle to drive in the virtual environment in response to a control operation that is input by a user into the graphical user interface;

determining whether movement of the virtual vehicle in the graphical user interface based on the control operation meets a control failure condition, the control failure condition indicating a predicted control failure of the virtual vehicle based on the movement of the virtual vehicle; and in response to a determination that the movement of the virtual vehicle in response to the control operation meets the control failure condition, automatically controlling a driving parameter of the virtual vehicle independently of the control operation that is input by the user into the graphical user interface to control the driving parameter, the automatically controlling being performed irrespective of the control operation that is input by the user, the automatically controlling including (i) performing data processing based on a position and a speed of the virtual vehicle using an auxiliary steering model to obtain a target position and a target speed of the virtual vehicle, and (ii) controlling the virtual vehicle to steer according to the target position and the target speed of the virtual vehicle.

2. The method according to claim 1, wherein the control failure of the virtual vehicle in response to the control operation is predicted when the speed of the virtual vehicle reaches a speed threshold, a distance between the virtual vehicle and a road bend boundary is less than a distance threshold, and an angle between a movement direction of the virtual vehicle and a tangent line of the road bend boundary reaches an angle threshold.

3. The method according to claim 2, wherein the automatically controlling the driving parameter of the virtual vehicle independently of the control operation comprises:

automatically adjusting, based on the speed of the virtual vehicle, the speed of the virtual vehicle to the target speed by using an auxiliary control function, wherein the target speed is determined according to the angle between the movement direction of the virtual vehicle and the tangent line of the road bend boundary.

4. The method according to claim 2, wherein the automatically controlling the driving parameter of the virtual vehicle independently of the control operation comprises:

automatically adjusting, based on the distance between the virtual vehicle and the road bend boundary, the distance between the virtual vehicle and the road bend boundary to a target distance by using an auxiliary control function.

5. The method according to claim 2, wherein the automatically controlling the driving parameter of the virtual vehicle independently of the control operation comprises:

automatically adjusting, based on the angle between the movement direction of the virtual vehicle and the tangent line of the road bend boundary, the angle between the movement direction of the virtual vehicle and the tangent line of the road bend boundary to a target angle by using an auxiliary control function.

6. The method according to claim 2, wherein a road bend in the virtual environment comprises an inner bend boundary and an outer bend boundary; and the method further comprises:

obtaining a first distance between the virtual vehicle and the inner bend boundary, and obtaining a second distance between the virtual vehicle and the outer bend boundary; and determining a smaller one of the first distance and the second distance as the road bend boundary.

7. The method according to claim 1, wherein the automatically controlling the driving parameter of the virtual vehicle independently of the control operation comprises:

in response to the determination that the movement of the virtual vehicle in response to the control operation meets the control failure condition, controlling display of an auxiliary control function control; and controlling the virtual vehicle to steer independently of the control operation in response to a trigger operation on the auxiliary control function control.

8. The method according to claim 1, further comprising:

controlling display of an auxiliary identifier on the graphical user interface, wherein the auxiliary identifier indicates that the virtual vehicle is being automatically controlled independently of the control operation.

9. The method according to claim 8, wherein the controlling the display of the auxiliary identifier comprises:

controlling the display of the auxiliary identifier at a peripheral position with respect to the virtual vehicle; or controlling the display of the auxiliary identifier at a peripheral position with respect to a driver avatar in the virtual vehicle.

10. The method according to claim 1, wherein a direction control is controlled to be displayed on the graphical user interface; and the method further comprises:

controlling display of control of the virtual vehicle on the direction control when automatically controlling the driving parameter of the virtual vehicle independently of the control operation.

11. The method according to claim 1, further comprising:

controlling display of an operation prompt on the graphical user interface, wherein the operation prompt displays a reason for the predicted control failure of the virtual vehicle and feedback for adjusting the driving parameter of the virtual vehicle.

12. The method according to claim 1, further comprising:

obtaining a sample steering video;

extracting a first position and a first speed of a sample virtual vehicle at a first moment from the sample steering video, and extracting a second position and a second speed of the sample virtual vehicle at a second moment, the second moment being later than the first moment, the first position, the first speed, the second position, and the second speed being used to determine the auxiliary steering model.

13. An apparatus for controlling a virtual vehicle, comprising:

processing circuitry configured to control display, on a graphical user interface, of the virtual vehicle in a virtual environment;

control the virtual vehicle to drive in the virtual environment in response to a control operation that is input by a user into the graphical user interface;

determine whether movement of the virtual vehicle in the graphical user interface based on the control operation meets a control failure condition, the control failure condition indicating a predicted control failure of the virtual vehicle based on the movement of the virtual vehicle; and in response to a determination that the movement of the virtual vehicle in response to the control operation meets the control failure condition, automatically control a driving parameter of the virtual vehicle independently of the control operation that is input by the user into the graphical user interface to control the driving parameter, the automatic control being performed irrespective of the control operation that is input by the user, the automatic control including (i) data processing performed based on a position and a speed of the virtual vehicle using an auxiliary steering model to obtain a target position and a target speed of the virtual vehicle, and (ii) control of the virtual vehicle to steer according to the target position and the target speed of the virtual vehicle.

14. The apparatus according to claim 13, wherein the control failure of the virtual vehicle in response to the control operation is predicted when the speed of the virtual vehicle reaches a speed threshold, a distance between the virtual vehicle and a road bend boundary is less than a distance threshold, and an angle between a movement direction of the virtual vehicle and a tangent line of the road bend boundary reaches an angle threshold.

15. The apparatus according to claim 14, wherein the processing circuitry is further configured to:

automatically adjust, based on the speed of the virtual vehicle, the speed of the virtual vehicle to the target speed by using an auxiliary control function, wherein the target speed is determined according to the angle between the movement direction of the virtual vehicle and the tangent line of the road bend boundary.

16. The apparatus according to claim 14, wherein the processing circuitry is further configured to: automatically adjust, based on the distance between the virtual vehicle and the road bend boundary, the distance between the virtual vehicle and the road bend boundary to a target distance by using an auxiliary control function.

17. The apparatus according to claim 14, wherein the processing circuitry is further configured to:

automatically adjust, based on the angle between the movement direction of the virtual vehicle and the tangent line of the road bend boundary, the angle between the movement direction of the virtual vehicle and the tangent line of the road bend boundary to a target angle by using an auxiliary control function.

18. The apparatus according to claim 14, wherein a road bend in the virtual environment comprises an inner bend boundary and an outer bend boundary; and the processing circuitry is further configured to obtain a first distance between the virtual vehicle and the inner bend boundary, and obtain a second distance between the virtual vehicle and the outer bend boundary; and determine a smaller one of the first distance and the second distance as the road bend boundary.

19. A non-transitory computer-readable storage medium storing computer-readable instructions thereon, which, when executed by a computer, cause the computer to perform a method for controlling a virtual vehicle, the method comprising:

controlling display, on a graphical user interface, of the virtual vehicle in a virtual environment;

controlling the virtual vehicle to drive in the virtual environment in response to a control operation that is input by a user into the graphical user interface;

determining whether movement of the virtual vehicle in the graphical user interface based on the control operation meets a control failure condition, the control failure condition indicating a predicted control failure of the virtual vehicle based on the movement of the virtual vehicle; and in response to a determination that the movement of the virtual vehicle in response to the control operation meets the control failure condition, automatically controlling a driving parameter of the virtual vehicle independently of the control operation that is input by the user into the graphical user interface to control the driving parameter, the automatically controlling being performed irrespective of the control operation that is input by the user, the automatically controlling including (i) performing data processing based on a position and a speed of the virtual vehicle using an auxiliary steering model to obtain a target position and a target speed of the virtual vehicle, and (ii) controlling the virtual vehicle to steer according to the target position and the target speed of the virtual vehicle.

* * * * *